March 14, 1961 R. P. BOYLE 2,974,980
REUSABLE HOSE END COUPLING
Filed Oct. 6, 1958 2 Sheets-Sheet 1
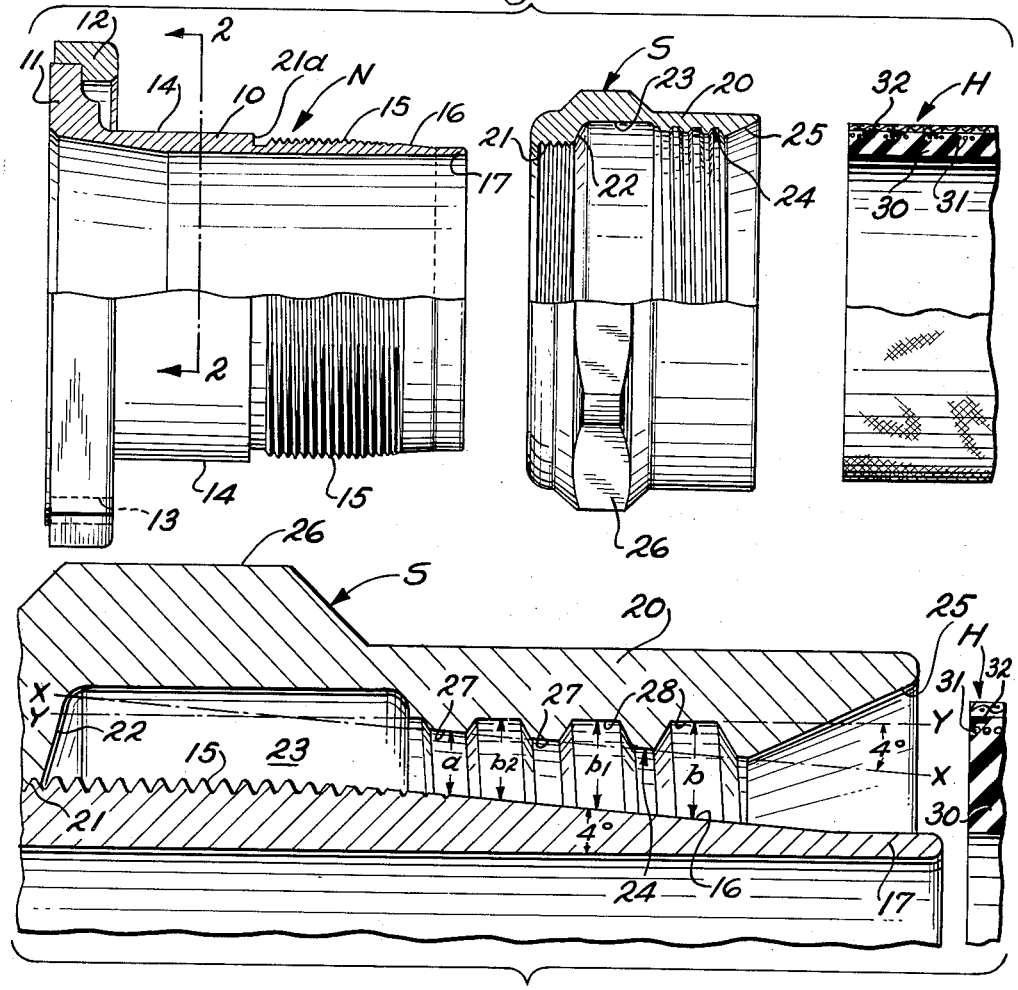
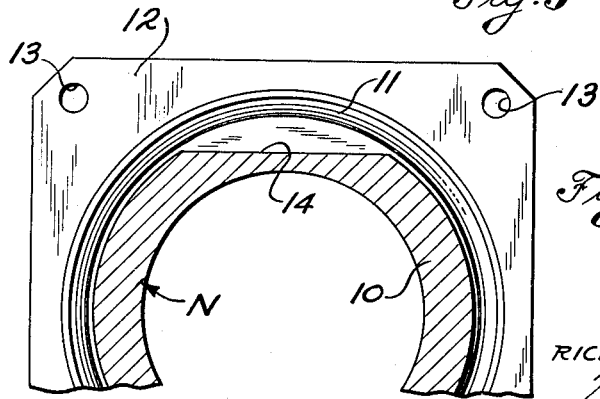
INVENTOR.
RICHARD P. BOYLE
BY
RICHEY, McNENNY & FARRINGTON
H. F. McNenny
ATTORNEYS March 14, 1961

R. P. BOYLE 2,974,980

REUSABLE HOSE END COUPLING

Filed Oct. 6, 1958

INVENTOR.
RICHARD P. BOYLE

BY
RICHEY, McNENNY & FARRINGTON

ATTORNEYS

United States Patent Office 2,974,980
Patented Mar. 14, 1961

2,974,980
REUSABLE HOSE END COUPLING
Richard P. Boyle, Bedford, Ohio, assignor to The Weatherhead Company, Cleveland, Ohio, a corporation of Ohio Filed Oct. 6, 1958, Ser. No. 765,378

2 Claims. (Cl. 285—247)

This invention relates to hose end couplings of the field attachable or reusable type. The coupling can be applied without crimping or otherwise deforming the coupling parts.

Hoses of the type referred to generally include three basic elements. First, there is an inner liner of leak-proof flexible material such as natural or synthetic rubber, plasticized polyvinyl chloride or the like. The liner is reinforced against internal pressure by a tension layer such as a wrapping or a braided sleeve (often formed of wire) and this layer is often protected against mechanical abrasion and wear by a flexible fabric cover formed of braided or knitted cords.

It is important that the rubber liner remain fluid tight after application of the fitting to the hose end and it is known that localized deformation of rubber or rubber-like elements introduces shear and tension stresses in the material that render it vulnerable to cracking and eventual rupture, particularly if the material is scratched or scored at the zone of such localized stress and strain. Of course the hose end portion lying within the coupling body is reinforced against bursting forces but bursting and leakage problems have arisen in that zone of the hose that lies just adjacent to the free end of the coupling.

It is a feature of the invention that localized stresses and strains at the aforesaid zone of the free hose portion are minimized to the extent that no leakage or bursting occurs in such zone under pressures short of the ultimate bursting strength of the hose proper.

It is known that when a hose and coupling assembly is connected in service the internal fluid pressure to which it is subjected exerts an axial or separating force that urges the hose end out of the coupling. It is another feature of the invention that the coupling will grip and retain the hose end without slippage or leakage up to the bursting strength of the hose, and yet the free portion of the hose is not subjected to localized strains and stresses that would gradually result in progressive local destruction of the liner with attendant leakage.

The coupling of the invention is of the type having a nipple or insert portion having a tapered nose for insertion into the hose and a nut or socket portion that surrounds the tapered nipple portion for gripping and confining the hose end. These parts are preferably screw connected so that the end of the hose is gradually deformed and gripped as the parts are screwed together. The socket is formed with internal rib means overlying the tapered nipple portion, preferably in the form of a helix or coarse thread, although in a modified form of the invention the rib means may take the form of a plurality of axially spaced circumferential ribs. Such rib means form, with the underlying tapered nipple portion, alternate hose displacing zones and hose receiving zones or pockets, and the hose receiving zones are of progressively decreasing volume in the direction away from the free end of the nipple. However, the hose displacing zones formed between the crown of the rib means and the tapered nipple portion are of substantially the same radial dimension. The result of this construction is to provide a gradual or transitional hose displacement and deforming action that is a maximum at the inner portion of the assembly but which is minimized adjacent the free end of the coupling. Thus the usual tendency of the free hose portion adjacent the end of the coupling to bulge radially outwardly is reduced or substantially absent, and the usual tendency of the hose liner to flow or fold radially inwardly around the free end of the nipple is likewise reduced so that the destructive localized stresses and strains referred to are absent or at least are small enough to have little or no deleterious effect on the life and leak resistance of the hose. Also, the hose will stand repeated flexing and vibration at the fitting without damage because stresses set up by such flexing are distributed along the coupling, instead of being largely concentrated and localized at the end of the coupling.

In the coupling of the invention, the advantages referred to above, which advantages are normally mutually inconsistent or incompatible with one another, are attained without loss of hose gripping action, the construction being one wherein the crown portions of the rib means are substantially radially equidistant from the underlying tapered nipple portion thereby providing a uniformly strong connection with the hose along the coupling.

The manner by which one skilled in the art may attain the above features and advantages in a hose end coupling will be apparent to one skilled in the art from the following detailed description of a preferred and a modified embodiment of the invention.

In the drawings:

Fig. 1 is an exploded section of a disassembled coupling and a hose end;

Fig. 2 is a partial section taken on 2—2 of Fig. 1;

Fig. 3 is an enlarged partial section of an assembled coupling with the hose end omitted for purposes of illustration;

Figure 4:
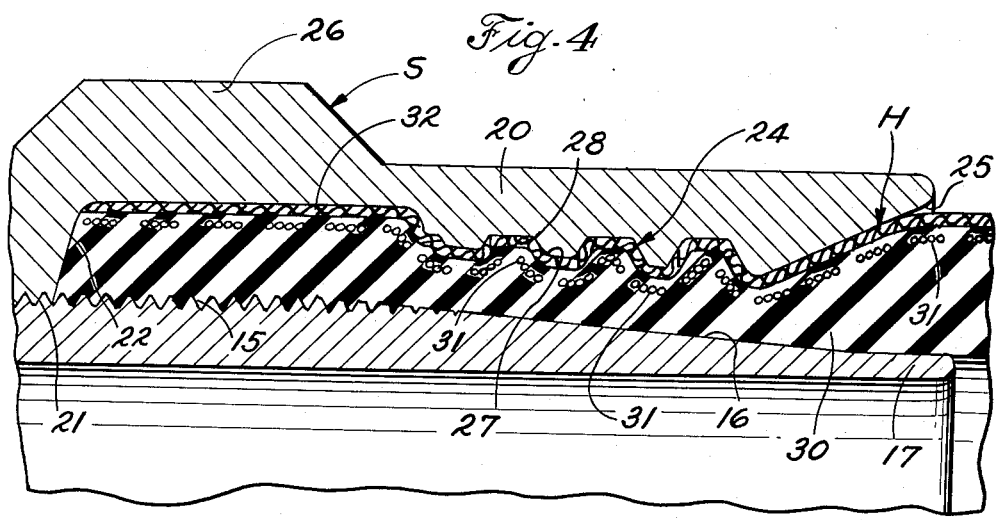
Fig. 4 is a similar section with a hose end clamped in place.

Referring to Figs. 1 to 4, the coupling has a nipple member N, and a nut or socket member S designed to receive the end of a flexible hose H. The nipple has a sleeve portion 10 that is flanged at 11 to receive a bolt flange 12, apertured at 13 for reception of attaching bolts. External flats 14 are formed on the nipple for gripping by a wrench, vise or other tool during assembly. The manner whereby sleeve portion 10 of the nipple is attached to other members is not critical to the invention, the flanged arrangement shown being just one of a number of connections known in the art. The nipple is externally threaded at 15 for connection to the socket S.

The free end portion of the sleeve 10 of the nipple has an externally tapered portion 16, which is formed with a taper of 4° relative to the nipple axis. The tapered portion 16 terminates in a short cylindrical nose portion 17 and it will be noted that in the assembled condition of the coupling the cylindrical portion 17 projects slightly past the end of socket S. For example, in a coupling designed to receive a hose having an outside diameter of about two inches, the cylindrical nose portion 17 of the nipple will be in the order of ⅛ inch long and will project past the socket by a length of 1/32 to 1/16 inch.

The socket S has a sleeve or wall portion 20 and an internally threaded flange 21 for attachment to the nipple by means of nipple threads 15. Flange 21 forms a hose end engaging wall 22 which bounds the inner end of a hose receiving pocket 23 the major diameter of which is somewhat less than that of the hose. The wall portion of the socket that overlies the tapered nipple portion is formed with an internal helical rib 24 that terminates adjacent the free end of the socket and merges with a flared mouth 25. Wrench receiving flats 26 are formed externally of the socket. The helix of rib 24 is formed of opposite hand to that of nipple threads 15 to prevent axially outward displacement of the hose relative to the socket during assembly.

The nature of rib 24, taken in conjunction with the underlying tapered nipple portion 16 forms an important part of the invention. Referring to Fig. 3, the rib 24 has crown portions 27 that form hose displacing zones, and there are hose receiving zones or pockets 28 between successive crown portions of the rib. Preferably the helical rib 24 resembles the Acme type thread in that it has flared or tapered side walls and the crown is truncated. The crown portions 27 of the rib lie in a substantially tapered or conical surface along the element or line X—X, which also makes an angle of 4° with the fitting axis so that these portions are equidistant from the tapered nipple portion, or in other words, the distance ($a$) indicated in Fig. 3 is substantially constant. On the other hand, the bases or roots of the hose receiving zones lie in a cylinder, or along element or line Y—Y parallel to the axis of the fitting, so that the spacings ($b$, $b_1$, $b_2$) of these zones decrease progressively in a direction away from the free end of the nipple.

In a typical fitting of the dimensions mentioned, the helical rib 24 will have a pitch in the general range of 5 to 10 ribs per inch and the depth of the deepest rib will be ½ of the pitch or less. As a result, in the example being given, a hose having a wall thickness of about 0.167 inch will be compressed at the "$a$" zones to a minimum thickness at these zones of 0.100 inch which represents a compression of about 40%, as this term is employed in the hose coupling art.

A typical hose for which the coupling is adapted appears in Figs. 1 and 4. The hose has an inner rubber liner 30 armored with a layer of wire braid 31, which is usually impregnated with rubber. The braid is covered with a woven or knit fabric layer 32.

To assemble the coupling with a hose, the usual procedure is to insert the hose end in the socket until the end wall of the hose abuts socket wall 22. This assembly is held against rotation and the nipple is threaded into the socket until flange 21 of the socket abuts a shoulder 21a formed on the nipple. During this operation the hose end wall is automatically kept against socket wall 22 because the helical rib 24 is of opposite hand to that of the nipple threads 15. As the tapered portion of the nipple progresses into the hose, crown portions 27 of the rib gradually displace the hose material into the hose receiving zones or pockets 28. The hose is also compressed at the terminal pocket 23. Displaced hose material is accommodated by the flared mouth 25 of the socket.

Because of the gradual change in volume of hose receiving pockets 28, due to the fact that distances ($b_2$, $b_1$ and $b$, Fig. 3), increase as they approach the flared mouth, virtually no bulge, either internal or external results in the assembled coupling. This minimizes localization of stresses at the free portion of the hose adjacent the end of the coupling, and prevents tension strains on the rubber liner at the free end of the nipple that would arise if the liner were forced or extruded partially around the free end of the nipple. The advantages of an assembly having these characteristics have been explained, and in the example previously referred to, tests have shown that a typical hose will burst under a fluid pressure of 1200 to 1400 p.s.i. without coming free of the coupling. Despite this powerful gripping action, the coupling of the invention so distributes compression and displacement of the hose material that the hose will withstand severe vibratory and flexing service without rupture at the end of the coupling.

Figure 5:
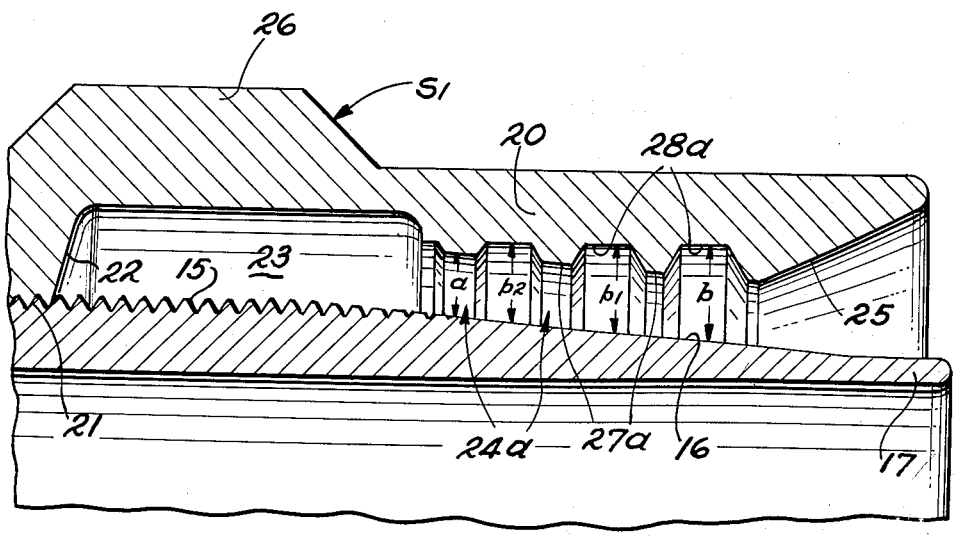
Fig. 5 is a partial section like that of Fig. 3 showing a modified form of socket member.

The embodiment of the invention of Fig. 5 differs from that described in that the socket $S_1$ has a plurality of circumferential ribs 24a of the same section as ribs 24, each rib 24a having a crown or hose displacing portion 27a between which are hose receiving zones or pockets 28a. The action of this embodiment of the invention with an assembled hose is like that of the previous embodiment except that during assembly there is no automatic maintenance of the end of the hose end against socket wall 22.

It will be noted that since the roots ($b$, $b_1$, $b_2$) of the hose receiving zones lie in a cylinder having an element "Y," the rib elements 24 or 24a can be readily machined in a simple lathe or boring tool by ordinary axial feed of a thread cutter in the form of Figs. 1–4 or by an ordinary type boring bar in the form of Fig. 5.

Although the foregoing description is necessarily of a detailed character, in order that the invention may be completely set forth, it is to be understood that modifications may be made without departing from the scope or spirit of the invention as herein claimed.

I claim:

1. A hose end coupling comprising a socket having a wall for surrounding the hose end, a nipple, means to connect said socket and nipple together in telescoped relation, said nipple having an externally tapered portion lying within said socket wall for projecting into the hose end, said tapered nipple portion being of increasing diameter in a direction away from the free end of the nipple, said means to connect said socket and nipple being adjacent the largest diameter of the tapered nipple whereby the nipple is inserted within the hose and socket as assembled and said means to connect the socket and nipple includes means for locking the nipple within the socket and hose when assembled therewith, said socket wall having internal circumferential rib means overlying said tapered nipple portion, said rib means providing more than two axially spaced circumferential hose receiving pockets and more than two hose displacing crown zones, said socket and nipple adjacent the maximum diameter of the nipple forming a chamber for the end of the hose, said chamber having an outer wall spaced from the nipple a distance greater than the distance from the nipple to the crown zone adjacent the chamber, the root diameter of said rib means being constant along the wall to provide with the tapered nipple portion hose receiving pocket zones of progressively decreasing radial dimension in the direction away from the free end of the nipple, the walls of said hose receiving pocket zones sloping gradually toward each other, the crown zones of said rib means being radially equi-distant from the underlying tapered nipple portion.

2. The hose coupling of claim 1 wherein said circumferential rib means is helical.

References Cited in the file of this patent

UNITED STATES PATENTS

| | | |
|---|---|---|
| 2,219,266 | Hirsch | Oct. 22, 1940 |
| 2,441,718 | Parker | May 18, 1948 |

FOREIGN PATENTS

| | | |
|---|---|---|
| 660,432 | Great Britain | Nov. 7, 1951 |
| 1,090,252 | France | Oct. 3, 1954 |